United States Patent [19]
Kowachek et al.

[11] 3,902,766
[45] Sept. 2, 1975

[54] TRACTION CONTROL FOR VEHICLES EQUIPPED WITH ORBITING TIRES

[75] Inventors: Victor J. Kowachek, Mt. Clemens, Mich.; James P. Carr, Silver Spring, Md.; Harold G. Kirchner, Issaquah, Wash.

[73] Assignee: The United States of America as represented by the Secretary of the Army, Washington, D.C.

[22] Filed: July 26, 1974

[21] Appl. No.: 492,104

[52] U.S. Cl. ................................. 305/34; 115/1 R
[51] Int. Cl.² ......................................... B62D 55/00
[58] Field of Search ............... 305/8, 10, 16, 17, 18, 305/34; 115/1 R

[56] References Cited
UNITED STATES PATENTS

| | | | |
|---|---|---|---|
| 2,867,480 | 1/1959 | Cushman | 305/34 |
| 2,916,006 | 12/1959 | Crandall | 115/1 R |
| 3,207,562 | 9/1965 | Ewing | 305/8 |
| 3,244,458 | 4/1966 | Frost | 305/34 |
| 3,695,736 | 10/1972 | Brown | 305/18 |
| 3,773,394 | 11/1973 | Grawey | 305/34 |

*Primary Examiner*—Philip Goodman
*Assistant Examiner*—John A. Carroll
*Attorney, Agent, or Firm*—Peter A. Taucher; John E. McRae; Robert P. Gibson

[57] ABSTRACT

A multi-terrain vehicle having ground-engaging tires arranged for orbital movement along upper and lower surfaces of sponsons located outboard of the hull. The tires are interconnected by means of chains, cables or similar flexible elements so that the tires move along the ground surface in one direction to develop vehicle propulsion thrust in the opposite direction. Each sponson has specially grooved or lugged surfaces cooperable with the tires to improve propulsion capabilities. In operations over gulleys or steep obstacles the tires lock onto lugs on the sponson front nose to lift the vehicle over the obstruction. The undersurfaces of the sponsons are grooved and impregnated with abrasive particles to promote tractive engagement with the tires during normal run operations. When the tires are running submerged in soft snow, sand, etc. the grooves plug up to promote sliding movements of the tires.

2 Claims, 11 Drawing Figures

TRACTION CONTROL FOR VEHICLES EQUIPPED WITH ORBITING TIRES

The invention described herein may be manufactured, used, and licensed by or for the Government for governmental purposes without payment to us of any royalty thereon.

BACKGROUND AND SUMMARY OF THE INVENTION

U.S. Pat. Nos. 3,154,045 issued to A. G. Fisher and 2,916,006 issued to L. Crandall show amphibious multi-terrain vehicles adapted for use in water, mud, and deep snow, as well as on conventional roads. In each case the vehicle includes ground-engaging tires arranged for orbital movement about longitudinally-extending sponsons located outboard of the vehicle hull. The tires are interconnected by means of endless belts or cables trained around pulleys at the front and rear ends of the sponsons. One set of pulleys is powered to move the belts or cables, and thus the tires.

The present invention relates to improvements in the type of vehicle shown in U.S. Pat. Nos. 3,154,045 and 2,916,006. Especially, the present invention seeks to provide the vehicle with an improved traction capability over a wide range of terrains.

THE DRAWINGS

THE DRAWINGS IN DETAIL

Figure 1:
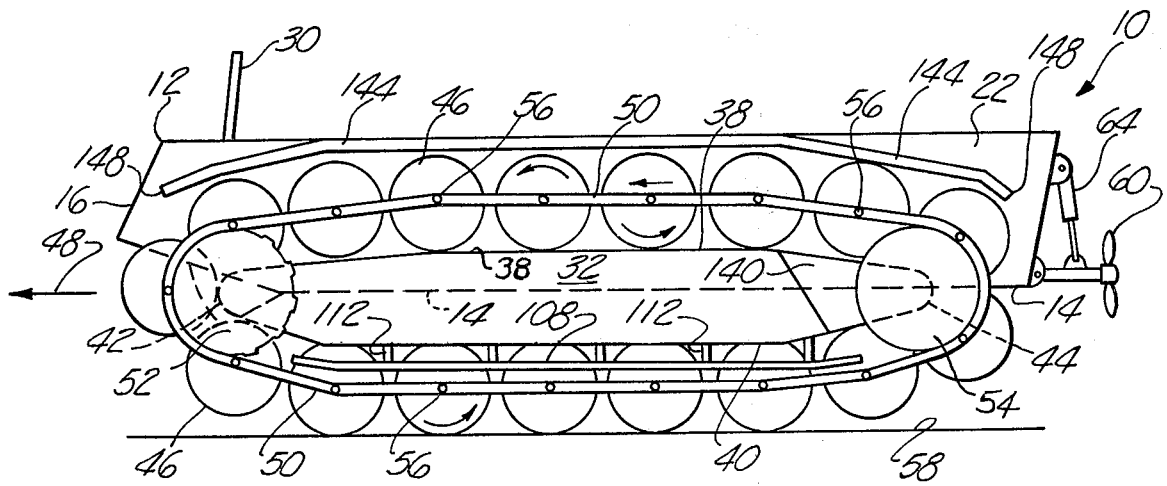
FIG. 1 is a side elevational view of a vehicle incorporating the present invention.
Figure 2:
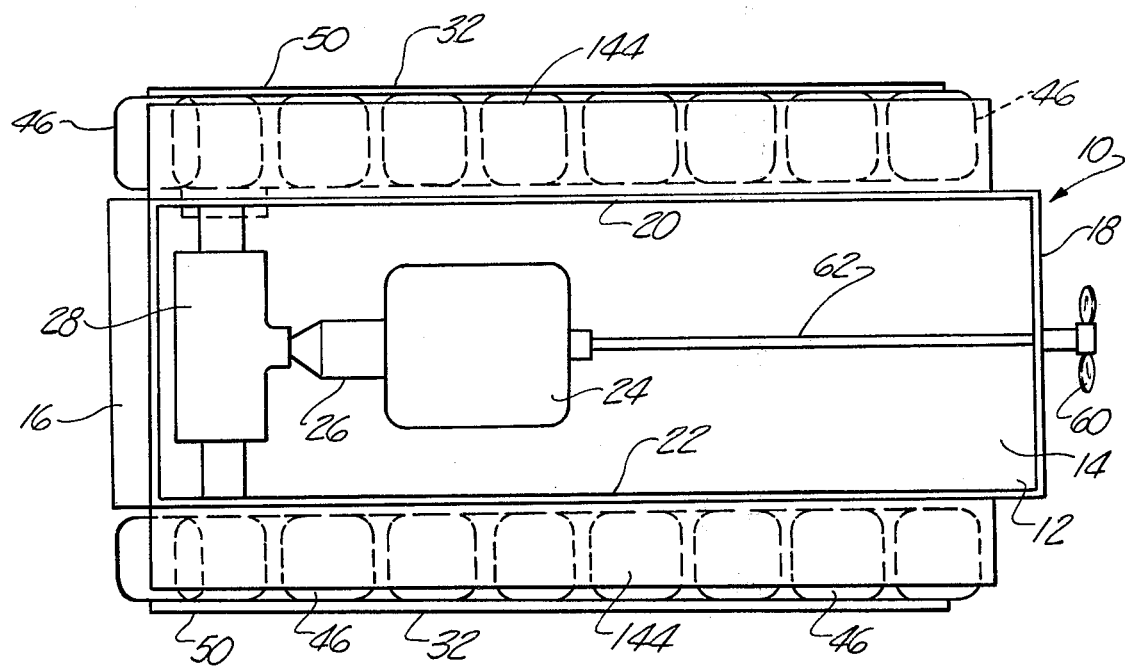
FIG. 2 is a top plan view of the FIG. 1 vehicle.

FIGS. 1 and 2 illustrate a multi-terrain vehicle 10 comprising an open-topped hull 12 having a bottom wall 14, front wall 16, rear wall 18 and side walls 20 and 22. Disposed within the hull is a propulsion engine 24 equipped with a transmission 26 and steering unit 28 having laterally-extending output shafts extending through openings in the hull side walls 20 and 22. The steering unit is employed to selectively operate the output shafts in the forward or rearward directions in accordance with the desired vehicle speed and direction of vehicle movement. The driver's seat, not shown, is located above and to one side of transmission 26, a short distance behind windshield 30. Passengers and/or cargo can be accommodated in the space behind engine 24.

Figure 3:
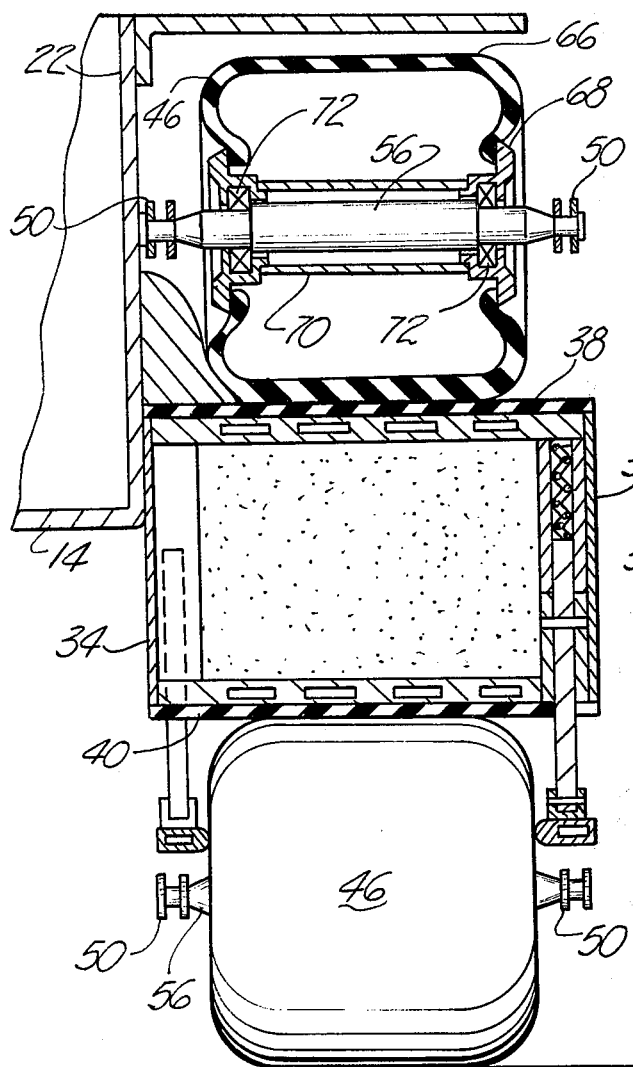
FIG. 3 is a sectional view taken on line 3—3 in FIG. 4.
Figure 4:
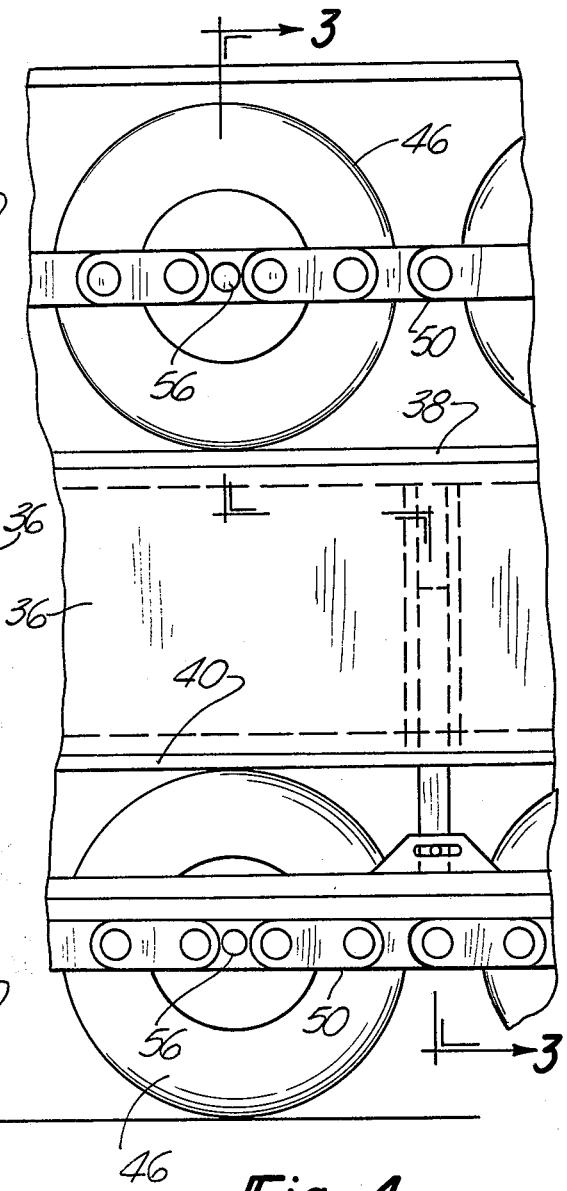
FIG. 4 is an enlarged fragmentary view taken in the same direction as FIG. 1, but at a point midway between the front and rear ends of the vehicle.

Located outboard of hull 12 are two longitudinally-extending sponsons 32, each a mirror-image of the other. As seen in FIG. 3 the rightmost sponson comprises an inner side wall 34 secured to hull side wall 22, an outer side wall 36, an upper wall 38, and a lower wall 40. As seen in FIG. 1 the sponson upper and lower walls are jointed together by a generally elliptical front nose structure 42 and a generally elliptical rear nose structure 44.

Each of the sponson walls 38 and 40 includes a rigid metal underwall and a resilient elastomeric outer wall or skin; the underwall provides sponson rigidity, and the skin provides a tread surface for tractive engagement with the ground-engaging tires or wheels 46.

Arranged for orbital movement about each sponson 32 are seventeen ground-engaging tires 46. Each tire traverses an endless orbit defined by upper sponson wall 38, frontal nose structure 42, lower sponson wall 40, and rear nose structure 44. When the vehicle is travelling in the forward direction, as denoted by numeral 48 in FIG. 1, the lower ones of tires 46 will be travelling rearwardly along sponson surface 40, and the upper ones of tires 46 will be travelling forwardly along sponson surface 38. Tire movement is accomplished through a power means which includes endless chains 50, sprocket-type drive wheels 52 at the sponson frontal nose, and idler wheels 54 at the sponson rear nose. Chains 50 could be replaced by cables if desired or necessary; cables are advantageous in that they are less susceptible to malfunction due to twisting, bending, clogging, etc.

As shown in FIG. 1, each set of chains 50 is trained around drive sprocket 52 and idler wheel 54; additionally each set of chains is connected to the various tire axles 56. Accordingly, powered movement of the sprocket wheels (by the aforementioned engine 24) produces an orbital movement of the chains 50 and the connected tires 46. The vehicle weight is borne by the tires while engaged with firm ground surface 58. Assuming the vehicle is travelling in the forward direction over firm terrain, the ground-engaged tires will be compressed between ground surface 58 and sponson lower wall 40. Tire compression will produce rolling tractive forces between the tire lower surface and the ground, and between the tire upper surface and the sponson. Such tractive forces combine with chain translational movements to propel the vehicle over firm terrain.

In very loose terrain, such as deep snow or swamps or loose sand, the vehicle weight can cause the vehicle to sink into the terrain so that the vehicle weight is borne directly by the sponsons rather than by the tires. Under such conditions the tires are subjected to reduced weight loads, and hence reduced tractive engagement with the terrain; the tires may then tend to skid on the sponson lower wall. Translational movement of the lower run of each chain will then translate each tire in piston-like fashion through the terrain, thereby bodily displacing the terrain and reacting the vehicle in the arrow 48 direction (assuming the chains are moving in the FIG. 1 directions). In deep water operations the vehicle may also be propelled by means of a propeller 60 located at the stern of the hull and suitably connected to engine 24, as by means of a drive shaft 62 and flexible coupling (not shown). The structure provides a degree of control when operating in surf. For overland operations the propeller may be retracted upwardly from its FIG. 1 position by a suitable fluid cylinder 64.

TIRE-CHAIN RELATION

FIG. 3 illustrates the general constructional features of a representative tire and its connection to the propelling chains. As there shown, the tire comprises a tire carcass 66 mounted on metal rims 68 carried by a tubular connector 70. Suitable sealed bearings 72 are provided between tube 70 and the supporting axle 56. The outer ends of the axle are affixed to the chains in any suitable fashion, as for example by welding. The axle thus travels with the chains, and the tire is free to rotate around the axle on the bearings 72. The annular space defined between tube 70 and tire carcass 66 may be inflated to a suitable air pressure, as for example 15 p.s.i. The annular space may be foam-filled for bulletproofing purposes if found necessary or desirable.

SOFT TERRAIN OPERATIONS - SPONSON BUOYANCY

During operations in very soft terrain, such as in snow or swamps, the vehicle may sink into the terrain to a level such that the sponsons are partially submerged. The sponsons and the air-filled tires 46 then act as flotation devices for the vehicle. The sponsons are preferably manufactured for maximum buoyancy and supportive surface area. Buoyancy is enhanced by forming each sponson as a hollow structure having a number of sealed interior chambers. In the illustrated construction separate chambers are defined by transverse bulkheads 159 (See FIGS. 5 and 7). The bulkheads give the sponson walls 38 and 40 the necessary rigidity to resist deformation or distortion. At least some of the chambers may be filled with a closed cell foam filler as protection against loss of buoyancy.

Adequate supportive surface area is attained by making each sponson relatively wide and relatively flat. Thus, as shown in FIG. 3, the sponson side walls 34 and 36 are spaced apart by a distance somewhat greater than the lengths of the wheel axles 56. The relatively wide sponsons overhang the tires 46 to give the sponson surfaces 40 a relatively large effective area. The sponson overhang increases the sponson volume for enhancing the buoyancy. The overhang also tends to shield the chains 50 from engagement with branches and other structures at the sides of the vehicle. The sponsons are essentially flat and horizontal for the major portions of their lengths to increase the effective supportive area for a given submersion of the sponsons.

With a vehicle weight of about 14,000 pounds, it is possible to have an effective sponson supportive area of about 7500 square inches, thus achieving a relatively low terrain pressure loading less than 2 p.s.i. Low unit area loadings are desirable when the sponsons are partially submerged in very soft terrain where the propeller 60 is not yet usable for propulsion purposes. The sponsons ride relatively high on the terrain to minimize the quantities of terrain that must be displaced to produce the desired vehicle propulsion. In this connection it will be appreciated that under these conditions the tires 46 no longer act as rolling tractive elements; instead they act as pistons. The tires enter the soft terrain as they turn around the sponson frontal nose 42. They remain submerged until they move up and around the rear nose 44. The tires displace the soft terrain rearwardly relative to the vehicle to produce the propulsion effect. The more buoyant the sponsons the less will be the required terrain displacement by the submerged tires 46, and the greater will be the velocity and maneuverability of the vehicle.

As can be seen from FIG. 3, the sponson lower walls 40 are disposed below the hull bottom wall 14 so that the hull rides clear of marsh, mud, soft snow, etc. The vehicle thus has relatively low drag in soft terrain operations while having satisfactory ground clearance over firm terrain, such as over rocks, stumps, humps, etc.

CHAIN DRIVE MECHANISM

Figure 5:
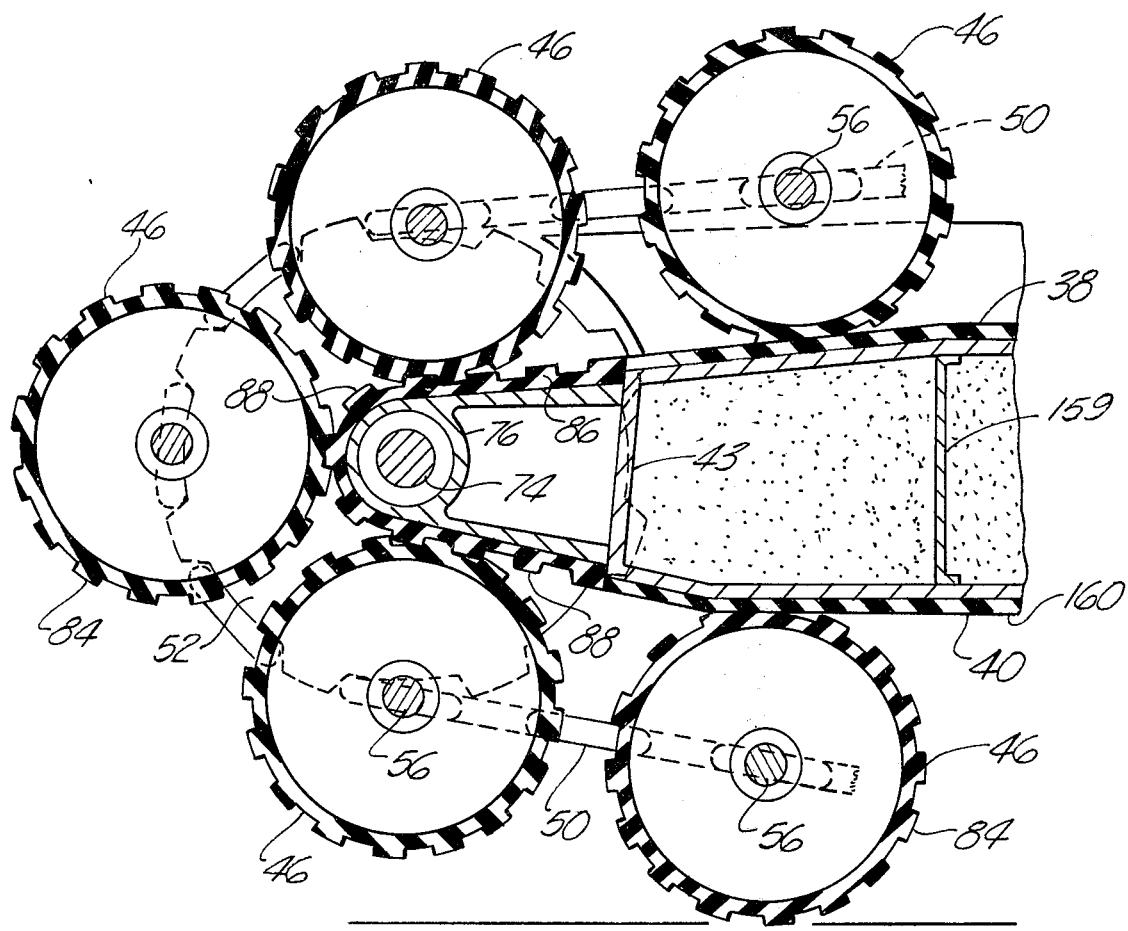
FIG. 5 is a fragmentary sectional view taken on line 5—5 in FIG. 6.
Figure 6:
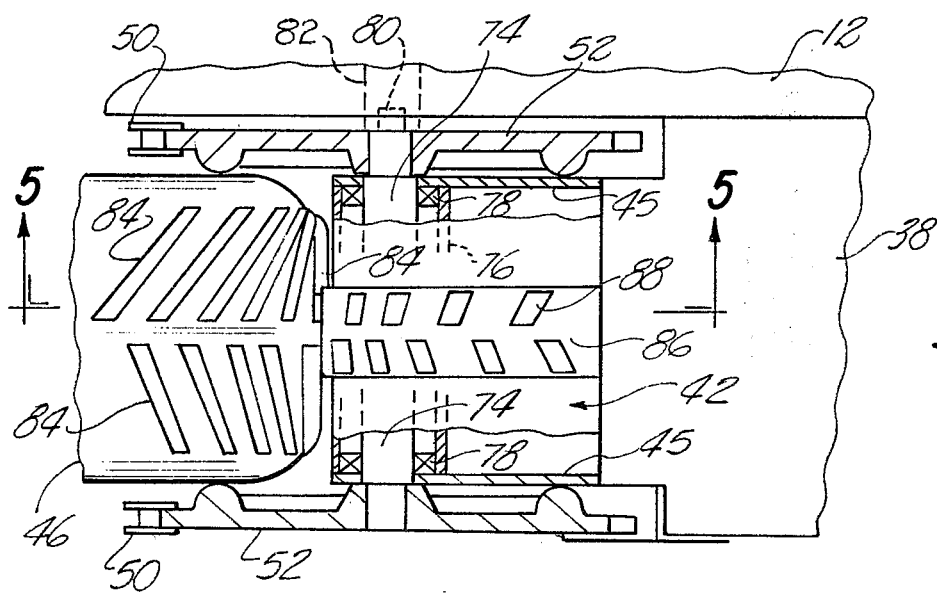
FIG. 6 is an enlarged top plan view of the frontal nose area of a sponson used in the FIG. 1 vehicle.

FIGS. 5 and 6 illustrate the general features of the chain-driving sprockets 52. Each sprocket is suitably affixed to one end of a shaft 74, as by means of a splined connection. The shaft extends within a sleeve-like formation 76 in the frontal nose element 42. Suitable sealed bearings 78 are interposed between the shaft and sleeve 76 so that the shaft and associated sprocket wheels 52 are free to turn around the shaft axis. Nose element 42 may be bolted or otherwise secured to the transverse sponson wall 43 so that the nose element in effect forms an integral part of the sponson structure. Removable end panels or plates 45 may be provided on the nose element for maintenance purposes.

The nose structure is illustrated in a semi-schematic fashion. In actual practice the nose structure would be sectionalized or structured in accordance with manufacturing requirements, maintenance considerations, types of bearings used or available, etc.

Shaft 74 may have its inner end formed as a square or other non-circular extension 80 for entry into a similarly configured socket in the output shaft 82 of the steering drive unit 28 (FIG. 2). Thus, engine 24, acting through transmission 26 and drive unit 28, produces rotary movement of each shaft 74 and the associated sprocket wheels 52.

CHAIN TENSION CONTROL

Figure 7:
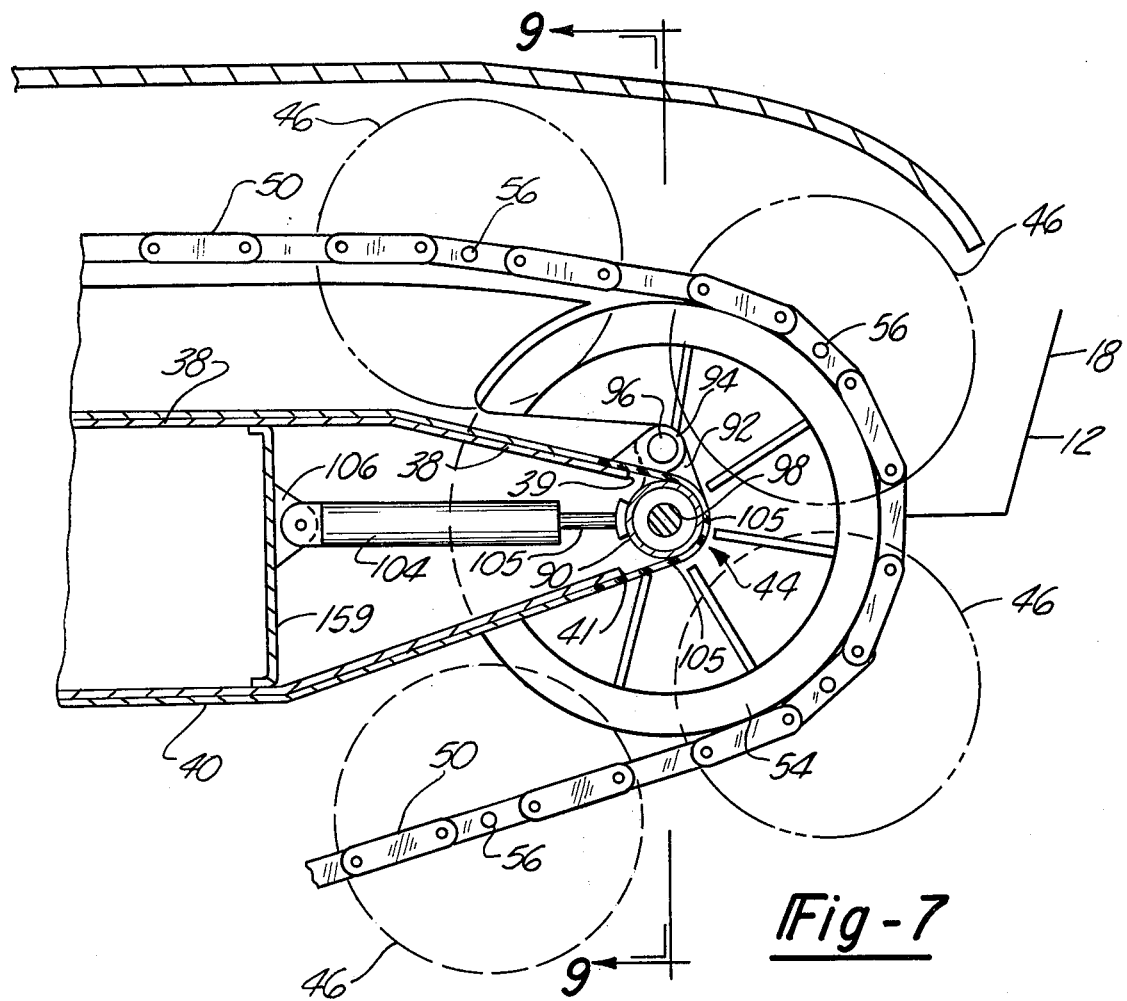
FIG. 7 is a fragmentary side elevational view of the rear nose area of a sponson used in the FIG. 1 vehicle.
Figure 8:
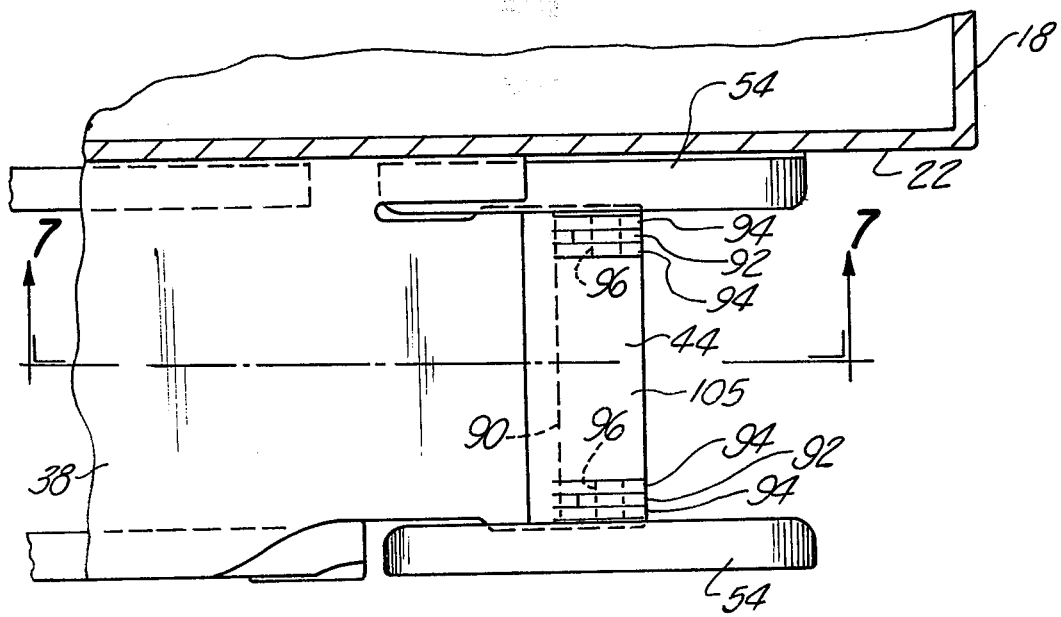
FIG. 8 is a fragmentary top plan view of the FIG. 7 nose area.

Chain tension may be controlled by a fluid cylinder located in the rear nose structure 44. As seen in FIG. 7, the fluid cylinder 104 is trained between a fixed anchorage 106 and a transverse tube 90 that is provided with upstanding pivot arms 92 at its opposite ends. Arms 92 extend upwardly into overlapment with lugs 94 carried by the sponson wall structure 38. Pivot pins 96 extend through the aligned members 92 and 94 to form a pivotal suspension for tube 90. Fluid pressure changes within cylinder 104 effect rocking movement of tube 90 about the axis defined by pivot pins 96. The position of tube 90 indirectly controls the tension in chains 50.

Figure 9:
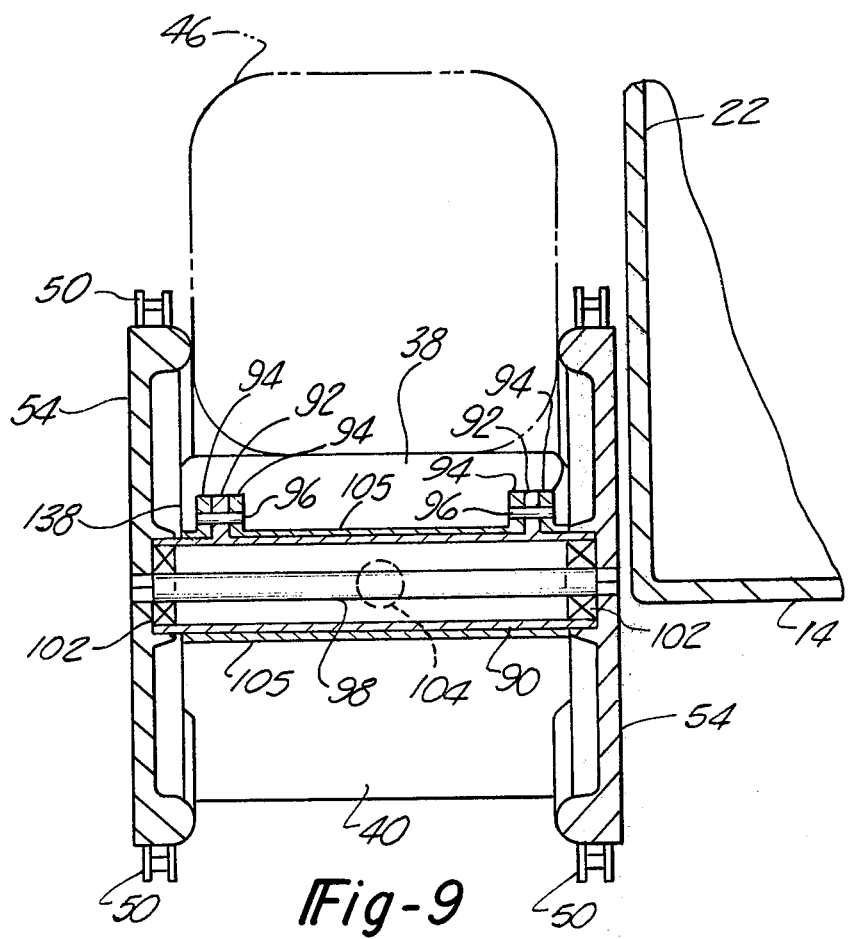
FIG. 9 is a fragmentary sectional view taken on line 9—9 in FIG. 7.

Extending within tube 90 is a shaft 98, whose opposite ends are affixed to idler wheels 54. The spacing between the idler wheels is equal to the spacing between the sprocket wheels 52 shown in FIG. 6 for enabling chains 50 to be trained around the idler wheels in parallelism with one another. Suitable bearings 102 (FIG. 9) are interposed between tube 90 and shaft 98 to permit the shaft-idler wheel assembly to rotate relative to the tube. Fluid cylinder 104 and tube 90 serve as a mechanism for adjusting the idler wheels 54 back and forth about the axis defined by pivot pins 96, thereby tensioning chains 50 in accordance with the pressure maintained in cylinder 104 by a pump means (not shown). A flexible stretchable sponson wall 105 overlies the surface of tube 90 to accommodate rocking movement of the tube.

TIRE SPONSON TRACTION

Figure 10:
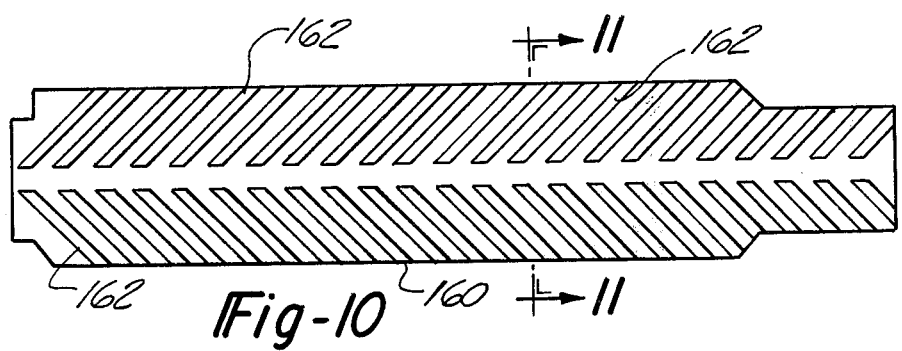
FIG. 10 is a bottom plan view of a tread surface employed on the lower face of a sponson used in the FIG. 1 vehicle.

When the vehicle is operating on firm terrain it is desired that the tire treads 84 have good tractive engagement with sponson lower wall 40. Accordingly the sponson lower surface is formed with a covering sheet 160 having grooves 162 in its exposed face (see FIG. 11). As seen in FIG. 10 grooves 162 extend rearwardly and outwardly from the longitudinal centerline of the sponson cover sheet. Grooves 162 give the sponson sheet 162 some improvement in tractive effect as compared to a smooth surfaced sheet. Additional improvement is achieved by incorporating finely divided abrasive particles 163 in sheet 160 during ints formation. The quantity of such particles is preferably selected so that the exposed surface of sheet 160 has a smoothness corresponding to that of sand paper. The abrasive particles increase the coefficient of friction of the elastomer 160 and also impart wear resistant qualities to the elastomer.

As shown in FIG. 6, the tire tread is a chevron pattern having an open strip in the center tire plane, and having bars or ribs 84 staggered on opposite sides of the center plane. Such a tread pattern has been found to offer a suitable compromise for satisfactory operation under widely varying conditions. On firm terrain the chevron pattern ribs offer good ground traction and sidewise stability, as when the tire is on the side of a hill or rut. In soft terrain, such as mud, soft snow and sand, the chevron pattern ribs provide a satisfactorily small centrifugal displacement of the terrain. A diamond lug pattern offers similar advantages to the chevron pattern.

OPERATIONS OVER GULLEYS

When the vehicle is travelling on flat land, either horizontally or up an incline, the tires will have vehicle propulsion capability while engaged with the flat portion of the sponson lower surfaces 40. On occasion the vehicle may be required to traverse a canal, gulley or depression that causes some or all of the tires engaged with the sponson lower surface to be immersed in water or to otherwise lose tractive engagement with the ground surface. Under such circumstances the tires located at the frontal nose of each sponson would ordinarily engage the side of the gulley or depression. Desirably such nose-located tires should be able to maintain tractive forces on the gulley bank or side surface to assist in pulling the vehicle up onto high ground. To promote such tractive forces the sponson nose surface is provided with a skin or covering 86 having outwardly projecting lugs 88. These lugs are angled to the tire center plane at the same angle as the tire ribs 84. Also, lugs 88 and ribs 84 are spaced so that the lugs and ribs can interact with one another in gear-like fashion. Should one of the tires engage the ground surface while moving around or along the frontal nose 42 the tractive force generated at the ground surface may initially cause the tire to slip or skid on surface 86 until the tire ribs 84 interlock with the lugs 88. Thereafter the tire will roll on the nose surface to generate an increased tractive effect on the ground and a movement of the vehicle up the side of the gulley or crevice, over a large boulder or building structure, etc.

TIRE SKID OPERATIONS

Figure 11:
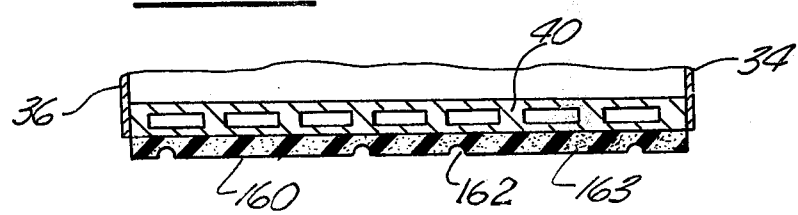
FIG. 11 is a sectional view taken on line 11—11 in FIG. 10.

When tires 46 are running through soft terrain wholly or partially submerged the tires desirably have a sliding piston-like movement along the underface of wall 40. Tire rotation is at such times to be avoided since such rotation would be accompanied by a tendency of the tire treads 84 to throw the terrain upwardly or outwardly rather than to displace the terrain rearwardly. Sliding or skidding movement of the tires on the sponson lower face is promoted by the sponson lower wall construction. As shown in FIGS. 10 and 11, lower wall 40 is provided with an elastomeric skin sheet 160 having grooves 162 slanting rearwardly and outwardly from the sponson centerline.

Grooves 162 slant rearwardly and outwardly at a different angle than the tire treads 84; e.g., grooves 162 may have an angle of approximately fifteen degrees relative to the sponson centerline, whereas the tire treads may have an angle of about thirty degrees relative to the centerline. Also, grooves 162 may be narrow and closely spaced such that the tire treads ride on the outer face of sheet 160 rather than entering into grooves 162. As a partially submerged tire rotates its treads 84 carry mud, snow or other media up onto the surface of sheet 160 and into the grooves 162; i.e., the treads sweep crosswise over grooves 162 to deposit mud or snow therein. The depth of each groove is such that when the tire is running on thin slippery films, as for example wetted firm soil, or wet grass, etc. Such rolling tractive engagement is maintained between the tire and sponson; grooves 162 convey water from the tire-sponson interface. When the tire is running in a submerged condition in deep mud or snow grooves 162 plug up; the effect is to make the sponson surface 160 sufficiently slippery to promote a reduced coefficient of friction and a semi-sliding movement of the tires rather than a tractive rolling movement. In most instances the tire rotation will probably be slowed but not completely stopped. The relatively viscous nature of the terrain in combination with the reduced coefficient of friction at the surface of sheet 160 tend to minimize undesired upward throwing of terrain during operations in deep mud, snow, loose sand, and similar media.

SUMMARY OF FEATURES

There is disclosed a vehicle having structural features for improving the ability of the orbiting tires to move the vehicle over a wide variety of terrains. The sponson nose structure shown in FIGS. 5 and 6 provides an interlocking engagement between the nose and the tires, thereby causing a positive rotation of each tire as it moves around the nose; the tire is thereby enabled to have tractive engagement with the sides of gulleys and other steep surfaces. The tread structure shown in FIGS. 10 and 11 provides a sliding surface when the tread structure and/or tires are immersed in muddy terrain, and a tractive surface when the tires are travelling on firm terrain. Thus, during submerged operations grooves 162 allow slippery mud films to build up at the tire-tread interface; the tires can thus slide through the terrain to displace the terrain rearwardly with minimum losses due to centrifugal forces. During operations on firm terrain the tread grooves 162 prevent build up of wet slippery films on the tread surface; grooves 162 cooperate with the abrasive particles 163 to provide a tread surface having increased traction properties. In general, the various described features are intended to provide the vehicle with increased vehicle-moving capabilities when operated over a wide range of terrains, including gulleys, mud, snow, soft sand and firm ground.

We wish it to be understood that we do not desire to be limited to the exact details of construction shown and described for obvious modifications will occur to a person skilled in the art.

We claim:

1. A multi-terrain vehicle comprising a hull having two outboard sponsons; rotary terrain-engaging tires powered for orbital movement along the upper and lower surfaces of each sponson; each sponson having a frontal nose surface engaged by the tires during their transitional movements between the sponson upper and lower surfaces; each frontal nose surface being defined by a relatively flat upper face area, a relatively flat lower face area, and a connecting curved face area; said tires having raised traction surfaces, and each sponson frontal nose surface having traction lugs therealong adapted to fit into the spaces defined by said raised traction surfaces, whereby the tires enjoy interlocking tractive engagement with the frontal nose surface for enabling the tires to lift the vehicle up along steeply inclined terrain.

2. A multi-terrain vehicle comprising a hull having two outboard sponsons; rotary terrain-engaging tires powered for orbital movement along the upper and lower surfaces of each sponson to move the vehicle; the sponson lower surfaces comprising an elastomeric sheet having closely spaced parallel grooves extending rearwardly and outwardly from points near the sponson longitudinal axis to the lateral edges of the elastomer, whereby said grooves define a recurrent V groove pattern along the sponson lower surface; the tires having widely spaced raised traction surfaces acutely angled outwardly from points near the mid plane of the tire to define a chevron pattern; the angulation of the raised traction surfaces being different than the angulation of the grooves in the sponson lower surfaces, whereby the traction surfaces extend crosswise of the grooves as they move along the sponson lower surface.

* * * * *